(12) United States Patent
Engibrecht et al.

(10) Patent No.: US 11,772,596 B2
(45) Date of Patent: Oct. 3, 2023

(54) GAS GENERATOR FOR VEHICLE SAFETY SYSTEM, AIRBAG MODULE AND VEHICLE SAFETY SYSTEM AS WELL AS METHOD FOR OPERATING A GAS GENERATOR

(71) Applicant: ZF Airbag Germany GmbH, Aschau a. Inn (DE)

(72) Inventors: Karl Engibrecht, Töging (DE); Johannes Ebner, Mühldorf (DE); Benedikt Peters, Munich (DE)

(73) Assignee: ZF Airbag Germany GmbH, Aschau a. Inn (DE)

( * ) Notice: Subject to any disclaimer, the term of this patent is extended or adjusted under 35 U.S.C. 154(b) by 0 days.

(21) Appl. No.: 17/944,695

(22) Filed: Sep. 14, 2022

(65) Prior Publication Data

US 2023/0079105 A1   Mar. 16, 2023

(30) Foreign Application Priority Data

Sep. 14, 2021   (DE) .......................... 102021123691.6

(51) Int. Cl.
*B60R 21/264*   (2006.01)
(52) U.S. Cl.
CPC ........ *B60R 21/264* (2013.01); *B60R 21/2644* (2013.01); *B60R 2021/2642* (2013.01)
(58) Field of Classification Search
CPC .................. B60R 2021/2642; B60R 21/2644
See application file for complete search history.

(56) References Cited

U.S. PATENT DOCUMENTS

| | | | |
|---|---|---|---|
| 9,073,512 B1* | 7/2015 | Mayville | B60R 21/264 |
| 9,623,834 B1* | 4/2017 | Quioc | B60R 21/26 |
| 2011/0221174 A1* | 9/2011 | Cox | B60R 21/264 |
| | | | 165/104.19 |
| 2015/0232057 A1* | 8/2015 | Hordos | F42B 3/04 |
| | | | 102/530 |
| 2019/0351863 A1* | 11/2019 | Ramp | B60R 21/2646 |
| 2022/0126780 A1* | 4/2022 | Simons | B60R 21/2644 |
| 2022/0281405 A1* | 9/2022 | Danielou | B60R 21/263 |

FOREIGN PATENT DOCUMENTS

| | | | | |
|---|---|---|---|---|
| CN | 2785923 Y | 6/2006 | | |
| CN | 104507761 A | * 4/2015 | ........ | B60R 21/2644 |
| CN | 108349457 A | * 7/2018 | .......... | B60R 21/264 |
| CN | 212654309 U | 3/2021 | | |
| CN | 114572148 A | * 6/2022 | | |
| DE | 29920123 U1 | * 2/2000 | ........ | B60R 21/2644 |
| DE | 102016120986 A1 | 5/2018 | | |
| DE | 202018100870 U1 | * 12/2018 | .......... | B60R 21/263 |
| DE | 102019121477 A1 | * 2/2021 | | |
| DE | 102019124042 A1 | * 3/2021 | | |
| DE | 102019131394 A1 | * 5/2021 | | |

(Continued)

*Primary Examiner* — Nicole T Verley
(74) *Attorney, Agent, or Firm* — Kristin L. Murphy (57) ABSTRACT

The disclosure relates to a gas generator for a vehicle safety system, comprising an ignition unit, a propellant configured in a combustion chamber in a form of a propellant bed extending along a longitudinal axis of the gas generator. A sleeve having an axial opening protrudes into the propellant bed such that it surrounds the ignition unit at least partially and portions of the propellant are stored inside and outside the sleeve.

18 Claims, 5 Drawing Sheets

(56) References Cited

FOREIGN PATENT DOCUMENTS

| | | | |
|---|---|---|---|
| EP | 1098790 B1 * | 9/2005 | ......... B60R 21/2644 |
| EP | 1658204 B1 * | 11/2009 | ......... B60R 21/2644 |
| JP | H1178766 A | 3/1999 | |
| JP | 2009101806 A | 5/2009 | |
| KR | 20030050971 A | 6/2003 | |
| KR | 20050011903 A | 1/2005 | |
| WO | 2001072560 A1 | 10/2001 | |
| WO | WO-2008140441 A1 * | 11/2008 | ......... B60R 21/2644 |
| WO | WO-2010037516 A2 * | 4/2010 | ............ B01D 39/12 |
| WO | WO-2016031656 A1 * | 3/2016 | ........... B60R 21/264 |
| WO | WO-2017055459 A1 * | 4/2017 | ......... B60R 21/2644 |
| WO | WO-2018198558 A1 * | 11/2018 | ................ B01J 7/00 |
| WO | WO-2020259157 A1 * | 12/2020 | ............. B60R 21/26 |

* cited by examiner

GAS GENERATOR FOR VEHICLE SAFETY SYSTEM, AIRBAG MODULE AND VEHICLE SAFETY SYSTEM AS WELL AS METHOD FOR OPERATING A GAS GENERATOR

CROSS-REFERENCE TO RELATED APPLICATION

This application claims priority to German Patent Application No. 102021123691.6, filed Sep. 14, 2021, the disclosure of which is incorporated herein by reference in its entirety.

TECHNICAL FIELD

The disclosure relates to a gas generator, in particular for a vehicle safety system. Further, the disclosure relates to an airbag module comprising such gas generator. The disclosure moreover relates to a vehicle safety system including such gas generator and to a method for operating such gas generator.

BACKGROUND

As is known, gas generators are used for various safety devices, specifically in vehicles. These type of gas generators permits a gas to be generated and/or released which is adapted to fill an inflatable airbag, for example, thus allowing a person to be protected in the case of crash. It is also possible to operate other safety systems such as a belt tensioner, a movable headrest or roll-over bars or a hood stay by a gas generator of this type in a vehicle.

It is moreover known that there are purely pyrotechnical gas generators comprising, apart from a pyrotechnical propellant which is configured in a combustion chamber in the form of a propellant bed extending along a longitudinal axis of the gas generator, an ignition unit. The ignition unit can help trigger, when the gas generator is activated, an ignition and, thus, a combustion of the propellant for respective gas generation.

Accordingly, it is also known to use gas generators having plural combustion chambers independent of each other which, each per se, enable gas generation separated from each other in terms of space and/or time. Such a multi-stage gas generator can also be designed as a purely pyrotechnical gas generator by appropriately comprising plural pyrotechnical stages in the form of the afore-mentioned independent combustion chambers. However, it is also possible that a known gas generator is present as a so-called hybrid gas generator which has, apart from the above-described combustion chamber including a propellant, also a chamber separated therefrom including a pre-stored compressed gas, wherein the compressed gas then can be released from the gas generator independently of the combustion chamber.

SUMMARY

The disclosure comprises both a purely pyrotechnical gas generator and a hybrid gas generator which includes at least one stage with an appropriate propellant in a combustion chamber.

With this in mind, a gas generator is proposed which, after being activated, enables as moderate combustion of the propellant as possible in its combustion chamber. Accordingly, components of the gas generator are intended to be loaded as gently as possible by forming an appropriate pressure inside the combustion chamber.

Further, a developed airbag module comprising a gas generator, a vehicle safety system comprising a gas generator and a method for operating a gas generator is also disclosed.

In accordance with the invention, this object is achieved, with respect to the gas generator, by the subject matter of claim 1, with respect to the method for operating a gas generator, by the subject matter of claim 11, with respect to the airbag module, by the subject matter of claim 12, and with respect to the vehicle safety system, by the subject matter of claim 13.

The disclosure is based on the idea that a gas generator for a vehicle safety system comprises an ignition unit and a propellant configured in a combustion chamber in the form of a propellant bed extending along a longitudinal axis of the gas generator, wherein, according to the disclosure, a sleeve having an axial opening protrudes into the propellant bed such that it surrounds the ignition unit at least partially and portions of the propellant are stored inside and outside the sleeve.

As the sleeve advantageously surrounds the ignition unit at least partially while portions of the propellant are stored inside and outside the sleeve, when or after the ignition unit is activated, two different portions of the propellant are ignited in different ways and/or are thermally converted generating a gas. This allows for a corresponding differentiated and, resp., more controlled behavior of the propellant during combustion thereof and during thermal conversion thereof.

For example, by the use or the presence of the sleeve when the gas generator is operated, plural crucial ballistic parameters such as the maximum of a combustion chamber pressure, the steepness of rise of the combustion chamber pressure and the whole time course of the combustion chamber pressure can be set and, resp., influenced more advantageously at all, as compared to a comparable gas generator which has no such sleeve installed in the manner of the gas generator according to the disclosure.

This will be illustrated in greater detail further below, in particular in the description of the figures.

In detail, it is also meant that, when the gas generator has been activated, by appropriate activation of the ignition unit initially a certain amount of hot ignition gases and/or ignition particles is discharged from the ignition unit, aiming at chemically and/or thermally converting the propellant inside the combustion chamber so that a gas can be generated which can leave the gas generator to the outside toward a specific device to be operated such as an airbag. During such so-called combustion of the propellant naturally a certain pressure, in particular a combustion chamber pressure, is formed which can reach, as a rule, values of several hundred bars, e.g., up to 800 bars or even more. Such pressure has a certain progression measured vis-à-vis the time in which it is formed and a maximum level or maximum pressure which correspondingly loads the combustion chamber and/or also further components of the gas generator mechanically. Now such load is desired to be moderate and as gentle as possible to the combustion chamber or further components so that corresponding wall thicknesses of components can be minimized, for example.

As the sleeve surrounds the ignition unit at least in partially and portions of the propellant are stored inside the sleeve, those portions of the propellant are more exposed to an ignition action of the ignition unit than the other portions of the propellant that are stored outside the sleeve.

For example, the portions of the propellant inside the sleeve are exposed more strongly and more directly to the pressure propagating from the ignition unit into the propellant bed as compared to the portions of the propellant outside the sleeve. In other words, the portions of the propellant outside the sleeve are shielded in a certain way from an excessive ignition action by the sleeve.

The portions of the propellant inside the sleeve thus can be more fragmented, on the one hand, i.e., can break by a corresponding ignition pressure of the ignition unit and consequently burn off more strongly and more rapidly by an enlarged igniting surface formed, and, on the other hand, said portions of the propellant are exposed more closely and more directly to the hot ignition gases and, resp., particles than portions of the propellant outside the sleeve. In this way, initially a comparably quicker first combustion of a part of the propellant can be achieved, which is also referred to as a desired quick onset of the performance curve of the gas generator. This can be seen, for example, from a comparison or by a measurement of the steepness of the increase in pressure versus time inside the combustion chamber, the so-called combustion chamber pressure, which will be described in greater detail further below.

By the design of the gas generator according to the disclosure, additionally a certain delay and/or a moderate combustion can also be achieved for portions of the propellant outside the sleeve, however. In general, portions of the propellant which are stored farther away from the ignition unit naturally can always be ignited at a somewhat later point in time. However, the disclosure helps defer or delay the time of combustion of the portions of the propellant outside the sleeve advantageously somewhat further, resulting in an altogether more moderate progression of the combustion of the whole propellant.

In addition, it has also turned out unexpectedly that the disclosure helps reduce the maximum of a combustion chamber pressure by the portions of the propellant outside the sleeve burning off more moderately as they are not loaded or loaded to a lesser extent by an ignition action of the ignition unit, hence do not fragment or break or fragment or break to a lesser extent. This can be proven by corresponding measurements of the combustion chamber pressure, as will be detailed further below.

In one exemplary arrangement, the sleeve surrounds the ignition unit at least partially at a radial distance and/or, apart from the propellant and the ignition unit, no further propellant is stored in the combustion chamber, in particular in the gas generator. As the sleeve surrounds the ignition unit at a radial distance, advantageously a corresponding, in one exemplary arrangement, ring-shaped, space can be provided which can be used for the following functional purposes.

On the one hand, the radial distance and, resp., an appropriately forming space allow to position there also portions of the propellant, specifically propellant pellets, so as to realize an as short distance as possible of as many propellant portions as possible around the ignition unit so that safe and quick ignition and combustion of the propellant are achieved. On the other hand, it is also conceivable to keep the corresponding space created by the radial distance free from propellant and to obtain there a space for corresponding pressure formation of an ignition pressure when the ignition unit is activated, and/or, in the event of a, particularly invariable, radial opening of the ignition unit in the case of release, to obtain sufficient space for appropriately opening the ignition unit in the radial direction. As, apart from the propellant and the ignition unit, no further propellant is stored inside the combustion chamber, for example in the gas generator, the whole gas generator can be operated by only one single type and configuration of a propellant. Consequently, no coordination is necessary concerning chemical or inner ballistic compatibility with a second propellant and/or an additional so-called "booster charge" which is a pyrotechnical preliminary stage for the propellant and is intended to ignite the same.

In one exemplary arrangement, the ignition unit protrudes at least partially into the propellant bed in such a way that a portion of the propellant is provided between the ignition unit and the sleeve. In this case, too, advantageously as many propellant portions as possible can be positioned around the ignition unit to ensure proper and quick ignition and combustion of the propellant, specifically by relatively well-targeted and/or limited fragmenting or breaking of the propellant and, thus, obtaining an increased surface for quick combustion of the propellant.

In a non-activated state of the gas generator, the axial opening of the sleeve advantageously is unsealed and is substantially surrounded by the propellant only. In this way, after activation of the gas generator and corresponding combustion, no obstructive additional component is positioned between the portion of the propellant inside and the portion of the propellant outside the sleeve. However, it would also be conceivable for the opening of the sleeve to be sealed by a relatively thin cover, specifically a film of metal, for example, to prevent any parts of the portions of the propellant inside the sleeve from falling out of the sleeve during the service life of the gas generator until activation thereof.

In one exemplary arrangement, the sleeve is stationarily secured to a housing of the gas generator or the ignition unit. In this way, before or when the gas generator is operated, the sleeve cannot slip or move in an undefined manner in the axial direction into the propellant bed, thus safeguarding a reproducible procedure in terms of interior ballistics.

The combustion chamber can extend, as to its axial longitudinal extension starting from the ignition unit, along the housing of the gas generator to a further component opposite to the ignition unit, for example a volume compensation arrangement or terminating part of the housing of the gas generator. In accordance with the present disclosure, the ignition unit also delimits the combustion chamber and, although it is not part of the combustion chamber, it can protrude into the latter, however. Thus, the ignition unit can form an axial delimitation of the combustion chamber, at least a section thereof and the opposite component can axially delimit the combustion chamber at the end opposite there. The opposite component may be a component disposed in the interior of the gas generator such as the volume compensation arrangement, but also a terminating part of the housing is imaginable in this case, such as a known lid or a known diffuser having outwardly disposed discharge openings. The shape of the combustion chamber and/or of the whole generator may be elongated in the manner of a tube or cylinder which has a smaller diameter as compared to its longitudinal extension. Just as well, a known toroidal outer housing is possible in which the outer diameter has a larger value compared to the axial construction height.

In one exemplary arrangement, the sleeve can extend into the propellant bed, relative to its longitudinal extension, in an range from 20% to 80% of the longitudinal extension of the combustion chamber. In one exemplary arrangement, the range is between 40% to 60%, and in another exemplary arrangement, the sleeve can extend 50% of the longitudinal extension of the combustion chamber. As described already in the foregoing, after activation of the gas generator, those portions of the propellant which are located inside the sleeve are thermally converted in a different way and, resp., experience a combustion behavior other than the portions of the propellant which are stored outside the sleeve. For example, the portions of the propellant inside the sleeve experience stronger fragmenting and heavier or quicker burning than the portions of the propellant outside the sleeve. This arrangement has corresponding effects on the combustion chamber pressure, for example, the increase in the combustion chamber pressure curve, the maximum combustion chamber pressure value reached and the total curve of the combustion chamber pressure. Thus, the time-dependent pressure curve in the combustion chamber can be adjusted optimally regarding the respective field of use of the gas generator advantageously by the axial length of the sleeve.

It has turned out that, in one exemplary arrangement of the gas generator in which the sleeve extends into the propellant bed regarding its longitudinal extension in a range of 50% of the longitudinal extension of the combustion chamber, an optimum and balanced curve of the combustion chamber pressure can be adjusted by adjusting a desired and sufficiently rapid initial combustion, viz. a relatively steep onset of the combustion chamber pressure, that is balanced vis-à-vis a moderate maximum combustion chamber pressure which does not mechanically load the combustion chamber to an inadmissibly high extent.

The sleeve can moreover have, as regards its longitudinal extension, 1.5 to 4 times, the value of the longitudinal extension of the ignition unit. In another exemplary arrangement, the sleeve can have a longitudinal extension 2 times the value of the longitudinal extension of the ignition unit. In addition, the sleeve can also be or alternatively be configured as a hollow body open to both end faces, specifically tube-shaped or funnel-shaped. By setting such a proportion, also the curve of the combustion chamber pressure can be optimally set, as described before. In addition, it may also be possible to set which part of the portion of the propellant being stored inside the sleeve is positioned axially in front of the igniter or radially next to the igniter, further fine adjustment of the curve of the combustion chamber pressure being possible. As the sleeve is funnel-shaped, after combustion of the portions of the propellant inside the sleeve an appropriately forming ignition beam can act differently upon the combustion of the remaining propellant outside the sleeve.

This means that by the combustion of the propellant inside the sleeve a correspondingly generated energy in the form of hot particles and/or gases will move, in the form of an ignition beam, in the axial direction away from the ignition unit to act upon the remaining propellant outside the sleeve. A funnel shape of the sleeve which can narrow or widen in the axial direction starting from the ignition unit thus allows to differently influence, in a respective ballistic manner, the remaining propellant outside the sleeve so-to-speak in the manner of a narrowing or widening nozzle in which the ignition beam is directed.

In one exemplary arrangement, the housing to which the sleeve is secured may be an outer housing of the gas generator, and/or the propellant may be formed of individual molded bodies, specifically compressed propellant pellets. The propellant may also comprise a bulk of individual propellant bodies such as compressed, particularly dry-compressed, propellant pellets or extruded bodies, but may also be provided in the form of broken granules or in the form of a monolithic molded body or in the form of stringed discs or rings.

The gas generator may additionally include a second ignition unit associated with a combustion compartment separate from the combustion chamber, the combustion compartment including a propellant and/or a stored compressed gas, and in one exemplary arrangement, a diffuser being axially interposed between the ignition unit and the second ignition unit. Accordingly, such a gas generator may also be configured as a multi-stage gas generator comprising at least two ignition units which can be activated at the same time or separately from each other. As is known, such a gas generator allows an inflatable airbag to be adjusted even more precisely to its application. It is even possible that, in the combustion compartment separate from the combustion chamber, likewise a sleeve is installed in the manner as above-described in the gas generator according to the disclosure.

In one exemplary arrangement, by activating the ignition unit, it is possible to generate a moderate combustion of the propellant and/or a lower pressure level inside the combustion chamber as compared to a gas generator which has no such sleeve as installed in the gas generator according to the disclosure. The advantages and the corresponding modes of action in this respect are already described in the foregoing.

Another independent aspect of the disclosure relates to a method for operating a gas generator, which may be a hybrid gas generator, according to the disclosure. The operating method according to the disclosure includes the following steps of:

a. providing a gas generator comprising an ignition unit, a propellant configured in a combustion chamber in the form of a propellant bed extending along a longitudinal axis of the gas generator, a sleeve having an axial opening protruding into the propellant bed such that it surrounds the ignition unit at least partially and portions of the propellant are stored inside and outside the sleeve;

b. activating the ignition unit and igniting the portion of the propellant located inside the sleeve, wherein particularly part of the portion of the propellant is broken by a pressure surg, of the ignition unit and, thus, a larger combustion surface is formed for quicker combustion; then;

c. igniting and burning the remaining propellant of the propellant bed at a combustion rate lower as compared to step b.

The advantages and the corresponding modes of action in this respect are described in the foregoing. For example, only by repetition the difference of combustion of portions of the propellant inside the sleeve as compared to combustion of portions of the propellant outside the sleeve shall be outlined.

Another independent aspect of the disclosure relates to an airbag module comprising a gas generator according to the disclosure, an airbag inflatable by the gas generator and a fastener for attaching the airbag module to a vehicle.

In addition, an additional independent aspect of the disclosure relates to a vehicle safety system, for example for protecting a person such as a vehicle occupant or pedestrian, comprising a gas generator according to the disclosure, an airbag inflatable by the latter as part of an airbag module, and an electronic control unit by which the gas generator can be activated when a release situation is given.

BRIEF DESCRIPTION OF DRAWINGS

In the following, the disclosure shall be illustrated in detail based on exemplary arrangements with reference to the attached schematic figures, wherein.

DETAILED DESCRIPTION

In the following, like reference symbols are used for like and equally acting parts.

Figure 1:
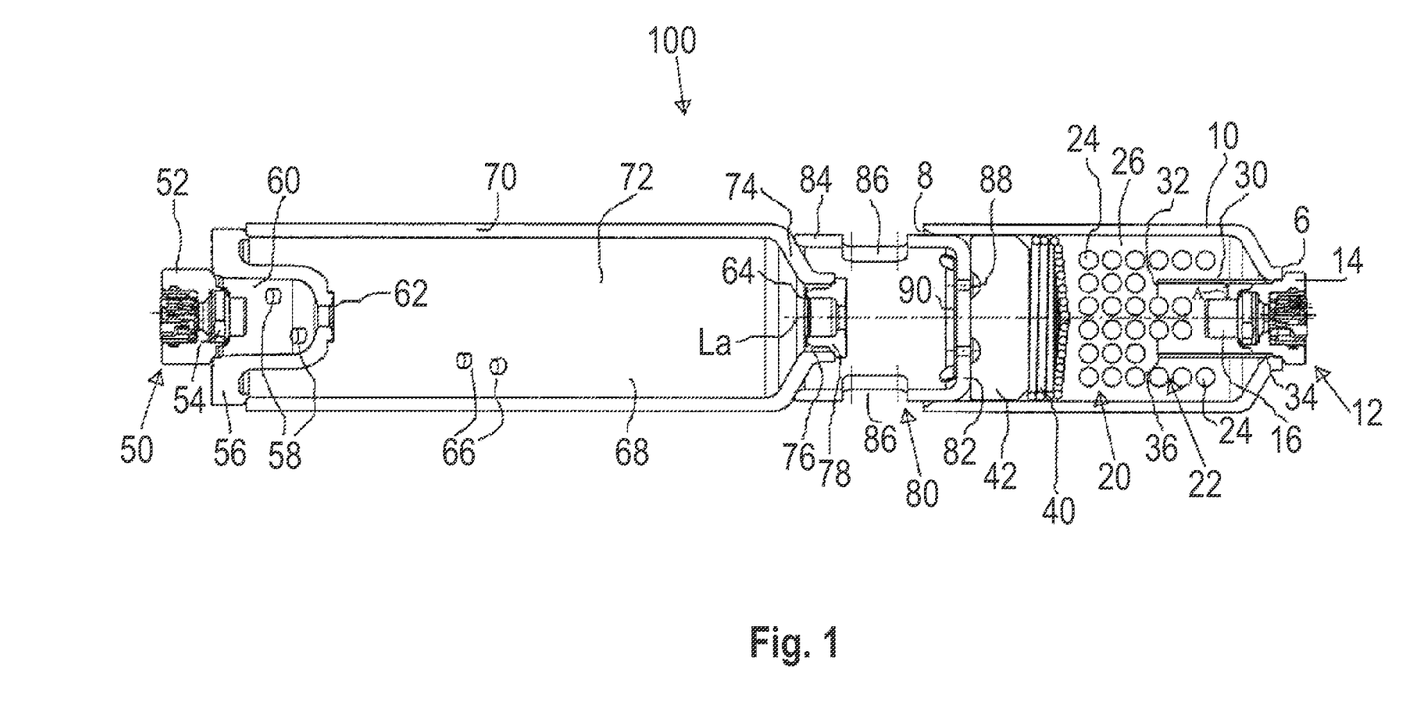
FIG. 1 shows a longitudinal section view across a gas generator according to the disclosure.

FIG. 1 illustrates a longitudinal section across a gas generator 100 with a longitudinal axis La which takes a shape extending in the longitudinally axis and is suited to be mounted in a vehicle safety system. The gas generator 100 has a plurality of single components, wherein also subassemblies, for example, in the form of pre-assembled units of plural single components, may be comprised. The gas generator 100 shown there comprises an exemplary arrangement having plural stages, viz. a purely pyrotechnical first stage that is substantially visible on the right in FIG. 1, and having another second stage that is filled with compressed gas 68 and is substantially visible on the left in FIG. 1, to the left of a diffuser 80. The purely pyrotechnical first stage already constitutes, considered per se, a gas generator according to the disclosure. The entire gas generator 100 shown in FIG. 1 comprising the afore-mentioned two stages also is an exemplary arrangement of the gas generator according to the disclosure and can be so-to-speak understood as a gas generator according to the disclosure in which a second stage with the compressed gas 68 is connected to the first purely pyrotechnical stage. In the following, this will be explained in detail.

The gas generator 100 according to FIG. 1 includes a housing 10 which is formed specifically of metal and also constitutes a large section of an outer housing of the gas generator 100. In one exemplary arrangement, the housing 10 is designed to be substantially tubular as an axially elongate hollow body, the respective opposite end faces being open. In other words, the housing 10 can also be understood to be a tube open to both sides which axially terminates at its two opposite end faces by a first end portion 6 and a second end portion 8. The housing 10 is molded in the area of the first end portion 6 to taper toward the longitudinal axis La of the gas generator 100. Said molding is designed to receive an ignition unit 12. Inside the housing 10 a combustion chamber 26 is provided which is filled at least partially with propellant 20 so that a propellant bed 22 extending along the longitudinal axis La of the gas generator 100 is formed.

The ignition unit 12 can be a pre-assembled subassembly comprising an igniter 16 and an igniter holder 14 and can be tightly secured in the area of the first end portion 6 of the housing 10. The ignition unit 12 may be a known subassembly which comprises the pyrotechnical/electrical igniter 16 that is held, specifically crimped, in the igniter holder 14 preferably made of metal, wherein the ignition unit 12 is inserted at the first end portion 6 configured as an opening and is welded there in a radially peripheral manner. However, it is also imaginable that the ignition unit 12 or only the igniter 16 alone is secured, using a plastic overmolding, to the first end portion 6 in the respective opening.

A sleeve 30 which is tube-shaped has, at its two opposite axial end faces, a first end 34 and a second end 36 both of which are open. Precisely, the sleeve 30 can be secured with its first end 34 to the igniter holder 14, particularly it can be slid onto the latter via press-fit and/or welded to the latter. Alternatively, or additionally, the sleeve 30 can be secured, for example, welded, also with its first end 34 to the housing 10, specifically to the inner wall thereof. It would also be imaginable that the sleeve 30 is secured, inserted or press-fitted, with its first end 34 by a clamping connection between the inner wall of the housing 10 and the igniter holder 14. The sleeve 30 concretely projects, with its second end 34 which is configured as an axial opening 32 of the sleeve 30, into the interior of the housing 10, precisely into the combustion chamber 26. In one exemplary arrangement, the sleeve 30 is a straight hollow circular cylinder and is positioned in the gas generator 100 so that it is aligned, with its radially peripheral outer surface, substantially coaxially relative to the longitudinal axis La of the gas generator 100.

The sleeve 30 has no further openings on its outer surface, wherein it is also conceivable, however, that relatively small flow openings are provided there which have an opening cross-section that is substantially smaller than the axial opening 32, however. In one exemplary arrangement, the sleeve 30 is made from metal, although it can also be formed of any other heat-resistant material such as a temperature-stable plastic material or a ceramic material.

The sleeve 30 protrudes, with its second end 34 and thus also with its axial opening 32, into the combustion chamber 26 so that it also protrudes into the propellant bed 22 in such a way that it surrounds the ignition unit 12 at least partially and portions of the propellant 20 are stored inside and outside the sleeve 30. The propellant bed 22 in this case is formed of a plurality of single propellant molded bodies, viz. propellant pellets 24, which are arranged in bulk in the combustion chamber 26. In other words, the sleeve 30 is an elongate hollow body open to both sides which is positioned in the propellant bed 22 such that it is closed on one of its end faces by the ignition unit 12 and, on the opposite end face, protrudes with the axial opening 32 into the propellant bed 22.

The propellant pellets 24 surround the sleeve 30 along its outer circumferential surface over a relatively large region, also surround the axial opening 32 of the sleeve 30 and extend far into the interior of the sleeve 30. In the exemplary arrangement according to FIG. 1, there is further visible a radial distance A between the inner wall of the sleeve 30 and the ignition unit 12, thereby a corresponding annular compartment being formed between the sleeve 30 and the ignition unit 12. It is also possible that propellant pellets 24 are stored in this compartment to surround the ignition unit 12 optimally and at an as small distance as possible so as to guarantee optimum ignition from the ignition unit 12 to the propellant pellets 24 when the gas generator 100 is activated. This is not shown in FIG. 1 for reasons of clarity. In general, the propellant pellets 24 can geometrically fill the entire interior of the sleeve 30 in such a manner as permitted by its geometrical dimension. When manufacturing the gas generator 100, first the ignition unit 12 can be installed into the housing 10, then the sleeve 30 can be attached to and fastened to the igniter holder 14 and, after that, the propellant pellets 24 can be filled into and, resp., compacted by vibration in the housing 10 from above so that they are located outside and inside the sleeve 30 or find their place there and project a considerable distance beyond the second end 36 of the sleeve 30, and in one exemplary arrangement, a distance equal to the length of the sleeve 30, in a direction away from the ignition unit 12. Then a volume compensation arrangement 40 can be attached or press-fitted onto a propellant bed 22 produced in this way so as to keep the propellant bed 22 and, resp., the individual propellant pellets 24 in position over the whole service life of the gas generator until activation thereof as intended. In this way, an inadmissibly strong movement of the propellant pellets 24 relative to each other can be prevented.

The combustion chamber 26 as it shall also be defined in accordance with the disclosure, is substantially delimited by the components of housing 10, ignition unit 12, sleeve 30 and volume compensation arrangement 40. The igniter 16, as an element of the ignition unit 12, appropriately delimits also the combustion chamber 26 and thus protrudes into the combustion chamber 26, but is not a constituent part of the combustion chamber 26. Hence, a possible propellant or, resp., possible pyrotechnics of the igniter 16 itself is not to be added to the propellant 20 according to the disclosure.

As is evident from FIG. 1, a filter 42 which is used to cool and/or filter combustion products such as hot gas and/or particles from the combustion of the propellant 20 in a known manner is connected axially, in a direction away from the ignition unit 12, to the volume compensation arrangement 40. A diffuser 80 in turn is axially connected to the filter which may be made from metal mesh, the diffusor 80 being a pot-shaped component, in one arrangement, made from metal and including a diffuser bottom 82 to which a radially peripheral diffuser sidewall 84 is connected. In the diffuser bottom 82 at least one or more flow openings 88 are arranged which, in the idle state of the gas generator 100 and, thus, before activation thereof, are closed by an optional over-ignition protection element 90 and, upon activation of the gas generator 100, are opened and released to discharge gas from the combustion chamber 26 into the interior of the diffuser 80 and, from there, through corresponding outlet openings 86 to the exterior of the gas generator 100.

The structure of the gas generator described in this way already corresponds to the gas generator according to the disclosure. FIG. 1 illustrates said gas generator described, until now, as a purely pyrotechnical, particularly second stage of the gas generator 100, and a further stage having a compressed gas storage is connected to said stage, as will be described in detail below, to be sure. However, already here it is explicitly noted that the previously described pyrotechnical stage already constitutes the gas generator 100 according to the disclosure.

It is further mentioned that, instead of the afore-described diffuser 80 which is a radially sealing outer housing of the gas generator 100, also a component of a different shape, in one exemplary arrangement, a simpler shape, can be used, such as a substantially planar or cup-shaped lid having corresponding outlet openings which allow gas to flow out of the interior of the gas generator 100 toward the environment of the gas generator 100. Such a simplified gas generator then would seal the gas generator in the axial direction by such a component acting as an outer housing. In addition, the afore-mentioned components of filter 42 and volume compensation means 40 are optional components and could be omitted, each per se or jointly, as required.

As is illustrated in FIG. 1, the gas generator 100 shown there additionally has a second ignition unit 50 associated with an independent combustion compartment 72 separate from the combustion chamber 26, wherein the combustion compartment 72 includes a propellant 66 and a stored compressed gas 68, and wherein the diffuser 80 is axially interposed between the ignition unit 12 and the second ignition unit 50. This means that, in addition to the already above-described design of a purely pyrotechnical stage axially terminating with the diffuser 80 and acting independently per se as a gas generator according to the disclosure, a further stage of the gas generator 100 including the stored compressed gas 68 can be connected, as will be described in greater detail in the following.

The second ignition unit 50 comprising a second igniter holder 52 in which a second igniter 54 is held, forms an axial end of the gas generator 100 opposite to the ignition unit 12. The second ignition unit 50 basically has a design similar to that of the ignition unit 12 and is secured, in particular radially peripherally welded, to a first closure piece 56. The first closure piece 56 is manufactured cup-shaped having a bottom which includes an opening, and a sidewall, particularly made from metal, and comprises, in its interior, a compartment configured as an ignition chamber 60. Accordingly, the first closure piece 56 is closed on the end face opposed to its bottom by the second ignition unit 50 and, on the end face axially opposed thereto, by a first burst element 62. The ignition chamber 60 is filled at least partially with a booster charge 58 which may be a pyrotechnical propellant, in particular in the form of single propellant pellets. The booster charge 58 may comprise a known pyrotechnical material which may include especially plural individual bodies, for example, in the form of pellets, rings, disks or granules, and may be used as required to back or, resp., to intensify the effect of the second igniter 54 and/or to open the first burst element 62 as intended, when the gas generator 100 is activated. Precisely, the booster charge 58 can be ignited by the second igniter 54 and can serve for a subsequent ignition of a propellant 66 and/or can effectuate or back the opening of the first burst element 62 as intended by appropriate formation of pressure.

An elongate outer housing component of the gas generator 100 is connected, specifically welded, in the form of a compressed gas tank 70 axially adjacent to the first closure piece 56. The compressed gas tank 70 is a hollow body open on its opposite end faces, an axial end and, resp., a front opening being closed by the first closure piece 56 and the first burst element 62. The axial end of the compressed gas tank 70 opposite thereto has an inwardly extending taper 74 that ends in a discharge opening 76 and is closed by a second closure piece 78 and a second burst element 64 secured thereto.

The compressed gas tank 70 comprises, in its interior, the combustion compartment 72 in which the compressed gas 68 and, optionally, also the propellant 66 which may be present as needed are provided to ensure better gas generation. Accordingly, the propellant 66 can be structured substantially in the manner of the propellant 20.

Precisely, the first burst element 62 can comprise a disk-shaped metal part with an optional predetermined breaking point which is welded radially peripherally onto the bottom area of the first closure piece 56, particularly onto the outer face thereof, the first closure piece 56 together with the first burst element 62 secured thereto thus sealing the compressed gas tank 70 in a pressure-tight manner.

The second closure piece 78 can be inserted, with the terminating second burst element 64 secured to said closure piece 78 as a pre-assembled subassembly, into the discharge opening 76 such that the second burst element 64 faces the interior of the compressed gas tank 70. The second burst element 64 may optionally comprise a predetermined breaking point and is welded to the corresponding end face of the second closure piece 78 in a pressure-tight and radially peripheral manner. The second closure piece 78 is radially peripherally welded, by a base-type extension formed thereon, to the compressed gas tank 70 so that it seals, together with the second burst element 64, the discharge opening 76 in a pressure-tight manner.

The combustion compartment 72 may comprise, by the compressed gas 68, a gas or a gas mixture, preferably can be provided with a gas out of the group of oxygen, helium and nitrogen and particularly at a pressure of 600 bars at room temperature. The compressed gas tank 70 thus can be so-to-speak pressurized by such pressure, before the gas generator 100 is activated, and consequently can represent a component or subassembly for a hybrid gas generator.

Concerning the over-ignition protection element 90, it is further noted that the latter can be secured to the diffuser 80 such that it seals the at least one flow opening 88 or, resp., all flow openings 88 in the diffuser bottom 82 in a gastight manner. Thus, the diffuser 80 is configured, in the area of the diffuser bottom 82, to be gas-impermeable by the over-ignition protection element 90 mounted in this way in the idle state of the gas generator 100, viz. in its non-activated state. The over-ignition protection element 90 can be secured to the diffuser bottom 82 by at least one welded, soldered or bonded connection. The over-ignition protection element 90 can additionally have a predetermined breaking point that is intended, when or after the gas generator 100 is activated, to break by pressure or gas pressure at or along the predetermined breaking point and, resp., to open the over-ignition protection element 90 there.

During assembly of the gas generator 100, the diffuser 80 can be assembled with the over-ignition protection element 90 to form a pre-assembled subassembly with the latter. As is evident from FIG. 1, such pre-assembled subassembly can encompass, by the open end of the diffuser 80, the compressed gas tank 70 at its axial end including the taper 74 on the outer face of the compressed gas tank 70 and, resp., can be attached thereto so as to be secured, specifically welded, in the area of the taper 74.

In the following, the function of the gas generator 100, as shown in FIG. 1, shall be explained during operation thereof as intended. When a signal for activation of the gas generator 100 is present, the latter is moved from an idle position into an activated or triggered position by activating the second ignition unit 50. For this purpose, the second igniter 54 is activated and releases a certain amount of energy in the form of hot particles and/or hot gases in the direction of the ignition chamber 60. If the booster charge 58 is present, it is ignited in this way and, in turn, releases a further amount of energy in the form of hot particles and/or hot gases, resulting in an increase in internal pressure inside the ignition chamber 60 such that the first burst element 62 is opened. If no booster charge is present, the effect and, resp., the energy of the second igniter 54 is sufficient already to open the first burst element 62.

Figure 5:
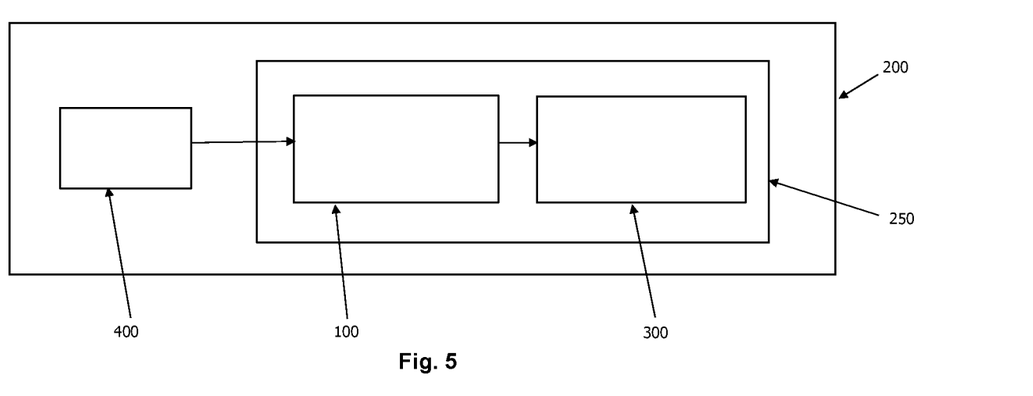
FIG. 5 shows a schematic view of a vehicle safety system that incorporates the gas generator of FIG. 1.

After that, the propellant 66 is ignited and burnt by the energy of the second igniter 54 and, where necessary, of the booster charge 58, resulting in an amount of gas to be generated which is intended to leave the gas generator 100 to be used for operating a vehicle safety system 200, as shown, for example in FIG. 5. In this way, the internal pressure inside the compressed gas tank 70 increases so strongly that the second burst element 64 is opened and the gas can flow into the diffuser 80 and, resp., into the interior of the diffuser 80 and then can continue to flow through the discharge openings 76 thereof into the environment of the gas generator 100. When the pressurized gas 68 is present inside the compressed gas tank 70, before the gas generator 100 is activated, said pressurized gas 68 can likewise flow through the opened second burst element 64 into the diffuser 80 and then into the environment of the gas generator 100.

In case that no propellant 66 is provided and the compressed gas tank 70 is only filled with a pressurized gas 68, before the gas generator 100 is activated, the energy of the second igniter 54 and, where necessary, of the booster charge 58 is sufficient to activate the compressed gas 68 and also to have the internal pressure inside the compressed gas tank 70 increase to such an extent that the second burst element 64 is opened.

The afore-described triggering or activation of merely the hybrid stage, viz. the stage of the gas generator which comprises the pressurized gas 68 and, thus, does not yet comprise triggering of the purely pyrotechnical stage of the gas generator which comprises the ignition unit 12 and the sleeve 30, may be desired in specific trigger situations or crash situations for a vehicle safety system and, resp., for the gas generator 100. Therefore, in this case the purely pyrotechnical stage must be prevented from being activated inadvertently, by thermal influences by activating such a hybrid stage. For this purpose, the over-ignition protection element 90 is arranged in the interior of the diffuser 80 on the diffuser bottom 82 so that the flow openings 88 thereof are covered or blocked for a gas flow, as is described in the foregoing. Thus, the over-ignition protection element 90 prevents hot gases from flowing through the flow openings 88 of the diffuser bottom 82 into the combustion chamber 26 and prevents the propellant 20 from being inadvertently ignited in the case that merely the hybrid stage of the gas generator 100 is to be activated as intended.

For the application that in addition to the hybrid stage also the purely pyrotechnical stage, comprising the sleeve 30, is intended to be activated (at the same time or time-shifted), after or when the hybrid stage is triggered/activated, also the purely pyrotechnical stage is activated. Accordingly, an activation of the igniter 16 initiates the activation of the purely pyrotechnical stage. Precisely, after activating the igniter 16, the latter is opened, particularly it can be opened in the radial and/or axial direction or can tear at its outer housing to release ignition energy in the form of hot gases and/or particles. Initially, the portions of the propellant 20 which are stored inside the sleeve 30 are ignited by the igniter, are burnt and, resp., thermally disintegrated. In so doing, it is possible or else desired that at least a certain proportion of said propellant portions is fragmented and, resp., is broken or comminuted, allowing to provide a larger surface for combustion. In this way, early and rapid generation of a gas for operating the gas generator 100 is achieved. Accordingly, this is referred to as a quick or steep onset of a combustion chamber pressure curve, i.e., a curve plotted over time which represents the progression of pressure formation in the combustion chamber 26.

In this context, it can be particularly advantageous when also propellant 20 and, resp., propellant pellets 24 are provided in the annular compartment which is enclosed by the sleeve 30 at the radial distance A from the ignition unit 12. Thus, a major part of the portion of the propellant 20 stored inside the sleeve 30 is in direct vicinity or preferably in the vicinity of the sphere of action of the ignition unit 12.

The combustion of the portion of the propellant 20 stored inside the sleeve 30 in turn also supplies or produces ignition energy in the form of hot gases and/or particles for the combustion of the remaining portions of the propellant 20 which are stored outside the sleeve 30. For example, a certain spatially directed or focused ignition beam having a particularly high energy density is generated. In other words, the sleeve 30 acts like a nozzle or a channel that bundles or transmits, geometrically directed, the thermally generated energy of the portion of the propellant 20, which burns inside the sleeve 30, into the remainder of the combustion chamber 26. Thus, also portions of the propellant 20 which are already outside the sleeve 30, but are arranged within the sphere of action of an axial projection of the axial opening 32 of the sleeve 30 axially downstream of the portion of the propellant 20 inside the sleeve 30, are caught more strongly and with higher energy by the ignition beam and therefore are burnt more quickly than those portions of the propellant 20 which are not located in the corresponding sphere of action of the sleeve 30 and of the ignition beam, respectively. This effect can also be geometrically refined or differently adjusted by the sleeve 30 being no linear circular cylinder but extending axially into the propellant bed 22 while conically tapering or conically widening. For example, the ignition beam can act quasi radially outwardly into the propellant bed, when the sleeve 30 extends into the propellant bed 22 while it widens conically outwardly in funnel shape.

In addition, the sleeve 30 also acts like a certain shield for portions of the propellant 20 which are not located in the afore-described sphere of action of the sleeve 30 or of the ignition beam. Accordingly, those parts of the proportion of the propellant bed 20 which are located radially outside the sleeve 30 and are stored relative to the second end 36 of the sleeve 30 in the direction of the igniter holder 14 are ignited most weakly and, resp., with a corresponding delay. In other words, energy discharged by the igniter 16 must first be directed around the axial opening 32 of the sleeve 30, i.e., must experience substantially an inversion of direction acting about 180 degrees and must propagate around the sleeve 30 as geometrical obstacle to ignite the remaining propellant there in a mitigated and appropriately desired gentler manner.

The afore-described activation of the purely pyrotechnical stage, viz. the combustion of the propellant 20 in the combustion chamber 26, triggered by activation of the ignition unit 12, generates a certain amount of gas or inflation gas which leaves the combustion chamber 26 and the gas generator 100 to the outside or is directed there. Precisely, the gas generated in the combustion chamber 26 can flow through the flow openings 88 of the diffuser 80, can appropriately open the over-ignition protection element 90 there to flow to the interior of the diffuser 80 and, from there, through the outlet openings 86 of the diffuser 80 into the environment of the diffuser 80.

It is explicitly outlined in this context that the above-described structure and the corresponding mode of function of the purely pyrotechnical stage, i.e., the combustion of the propellant 20 in the combustion chamber 26, triggered by activation of the ignition unit 12, is already sufficient to describe, to comprise and to illustrate the function of the gas generator 100 according to the disclosure.

In other words, the hybrid stage, viz. the stage of the gas generator comprising the compressed gas tank 70, can be optionally connected to the purely pyrotechnical stage so as to constitute, together with the purely pyrotechnical stage, as a whole also a or, resp., the gas generator 100 according to the disclosure.

In other words, regarding FIG. 1 the hybrid stage is not necessary to comprise the gas generator 100 according to the disclosure. Accordingly, the gas generator 100 according to the disclosure can have its left end (reference to FIG. 1) or, resp., its axial end there already with the diffuser 80 and can form with the diffuser 80 a sealing front-side housing part of the gas generator 100 there. As already described further above, such a sealing housing part can also be a known lid including outwardly arranged discharge openings and, hence, need not necessarily take the geometrical shape and configuration of the diffuser 80.

Figure 2:
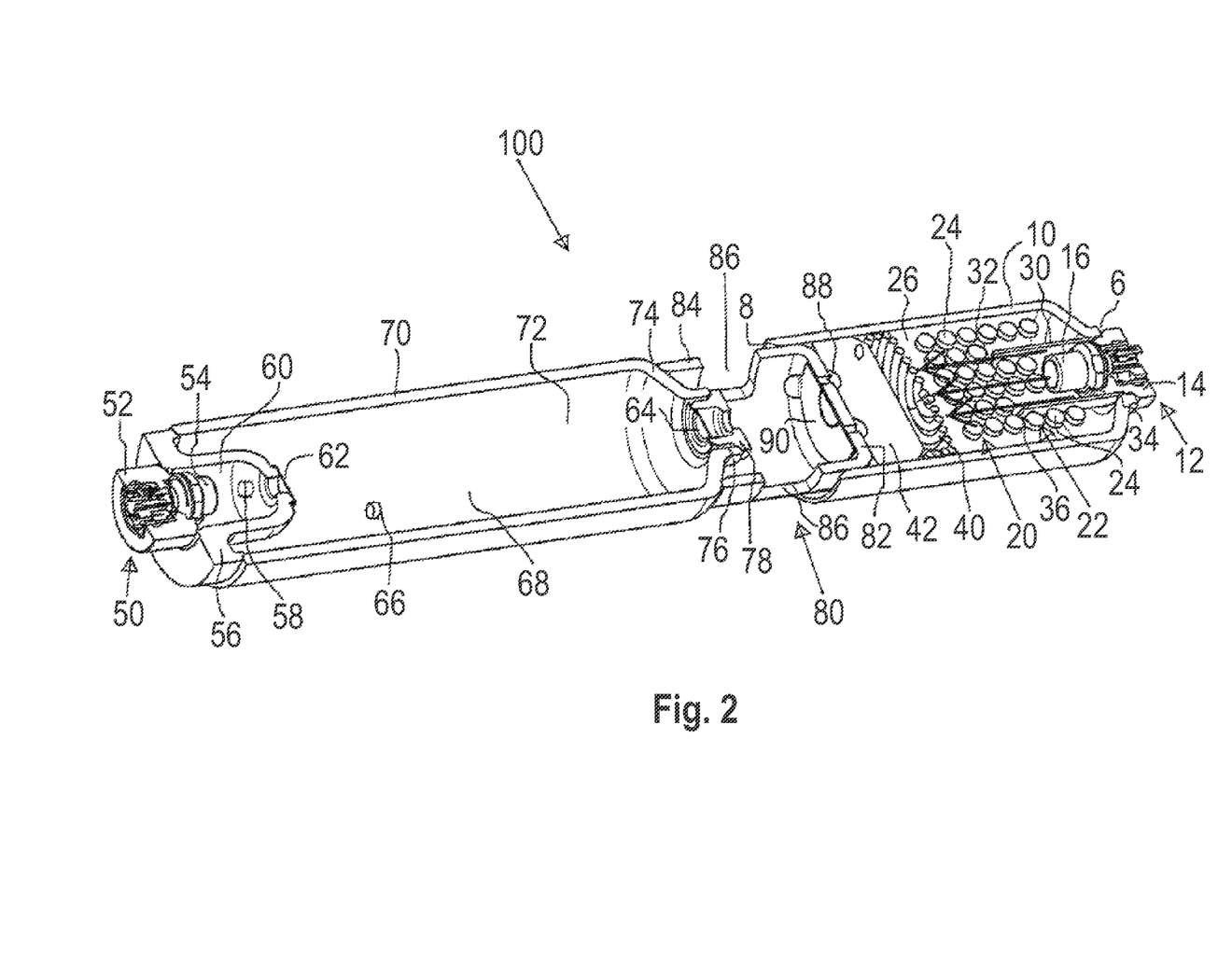
FIG. 2 shows a perspective view of the gas generator according to the disclosure of FIG. 1.

FIG. 2 illustrates a perspective view of the above-described gas generator 100 as shown in FIG. 1. In FIG. 2, the same reference symbols as in FIG. 1 are applicable to like and equally acting parts. Since the gas generator 100 as illustrated in FIG. 2 is the same exemplary arrangement of the gas generator 100 as it is illustrated in FIG. 1, a detailed description of FIG. 2 is dispensed with and reference is made to the description of FIG. 1. Basically, FIG. 2 as perspective view of the gas generator 100 according to FIG. 1 is intended to allow for a better spatial perception or representation of the gas generator according to FIG. 1 only.

However, as compared to FIG. 1, in FIG. 2 an ignition beam is symbolized using three individual arrow symbols, as it is described in words already in the foregoing with respect to FIG. 1. Accordingly, after activating the ignition unit 12, by combustion of the portions of the propellant 20 which are stored inside the sleeve 30, an energy transfer that acts more heavily and strongly can be exerted upon the portions of the propellant 20 which are stored outside the sleeve 30 in the sphere of action of the ignition beam.

Figure 3:
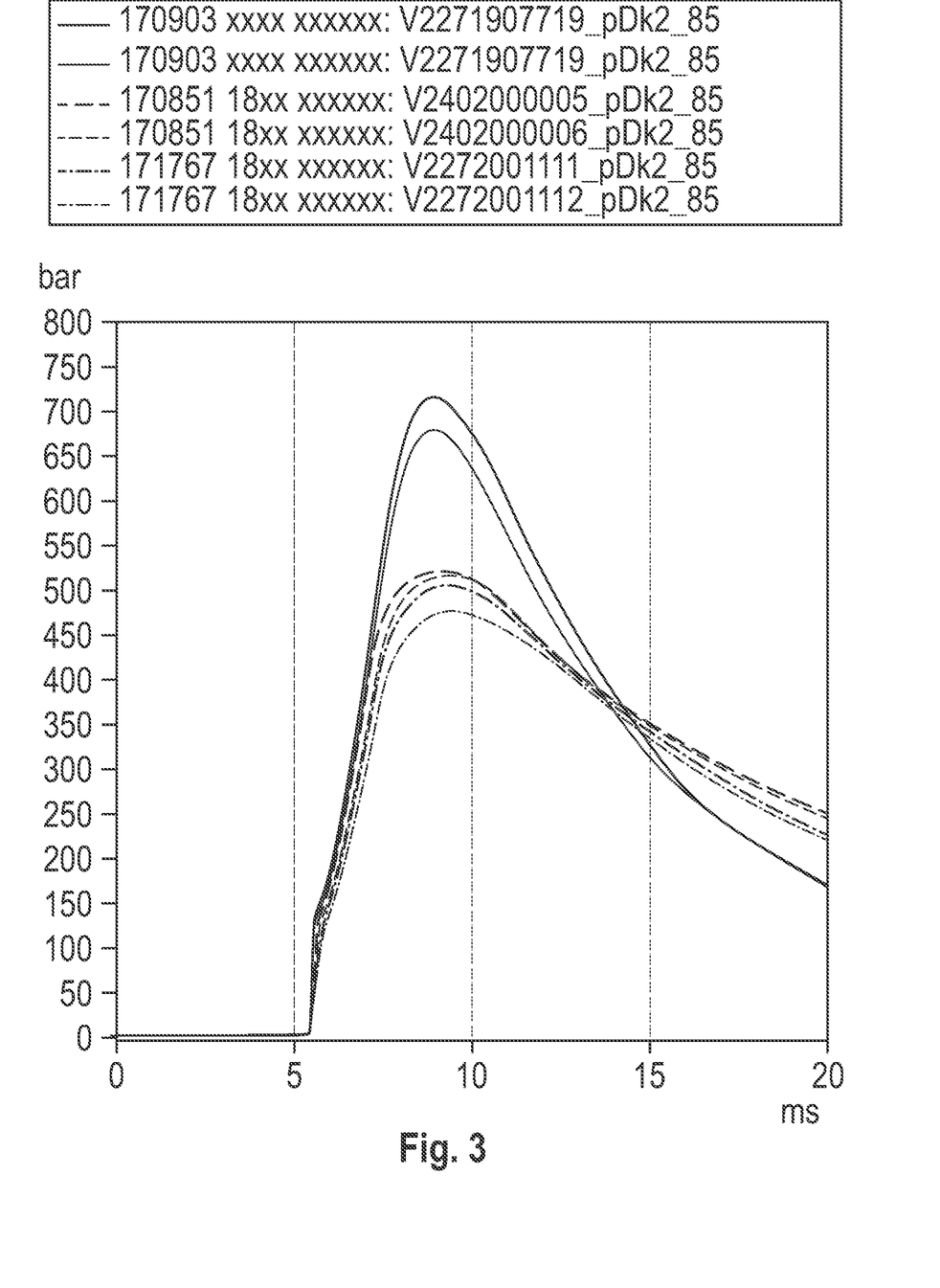
FIG. 3 shows a graph illustrating a comparison of combustion chamber pressure curves of a known gas generator with combustion chamber pressure curves of the gas generator according to the disclosure.

FIG. 3 illustrates a graph showing a comparison of combustion chamber pressure curves of a known gas generator with combustion chamber pressure curves of the gas generator according to the exemplary arrangement. Precisely, for determining those combustion chamber pressure curves, appropriate gas generators were set up in a test laboratory, wherein pressure sensors were accommodated in the respective combustion chambers to record the specific combustion chamber pressure. Then the corresponding gas generators were triggered and, resp., activated as intended, wherein the respective propellants were burnt in the specific combustion chambers, and the combustion chamber pressure curves were recorded as pressure values by the unit "bar" as compared to the time by the unit "ms" (milliseconds).

Precisely, the known gas generators were set up without a sleeve in their combustion chamber, and the gas generators according to the disclosure were set up, corresponding to the above-described design in accordance with the present gas generator 100 of the invention, with the sleeve 30 the axial opening 32 of which protrudes into the propellant bed 22 in such a way that it surrounds the ignition unit 12 at least partially and portions of the propellant 20 are stored inside and outside the sleeve 30. In the concrete example, known single dry-compressed propellant pellets 24 were installed as propellant 20 for the propellant bed 22, as sketched in FIGS. 1 and 2, and a sleeve 30 having an axial overall length of 18 mm was used. The ambient temperature of all tested gas generators amounted to "+85° Celsius". This temperature corresponds to a known upper limit for gas generators at which they are intended to operate without complaint, and is frequently stated in known specifications for gas generators of the present type. In order to be able to even better verify the values for the gas generator 100 according to the exemplary arrangement and also to exclude any possible systematic error, for the setup and the test procedure for the gas generator 100 according to the disclosure two test procedures to be run separately from each other were carried out, which is visible from the corresponding different group numbers for the test numbers, i.e., twice "170851" and the two numbers "171767" listed there below, in the legend in FIG. 3.

As is clearly evident from FIG. 3, there is a set of curves of two individual curves which are arranged substantially around the value of 700 bars with respect to the maximum value reached of the combustion chamber pressure and are clearly different from a set of curves being far below that, comprising four individual curves the individual values of which substantially oscillate around or are arranged around the value of 500 bars. As in the legend in FIG. 3 which is evident concerning the pressure curves depicted there below, the two combustion chamber pressure curves with the high values of around 700 bars have to be associated with the known gas generators, wherein the combustion chamber pressure curves with the substantially lower values of around 500 bars have to be associated with the gas generators 100 according to the present disclosure.

In other words, the gas generator 100 according to the present disclosure enables, when being operated, the maximum value in its combustion chamber 26 to be advantageously substantially lowered. In the present test series, by the gas generator 100 according to the disclosure a respective pressure reduction by about 30 percent with respect to the maximum combustion chamber pressure was reached, which means an enormous advantage regarding material design and/or material saving, in particular regarding appropriate wall thicknesses, of components which contribute to forming the combustion chamber 26.

Figure 4:
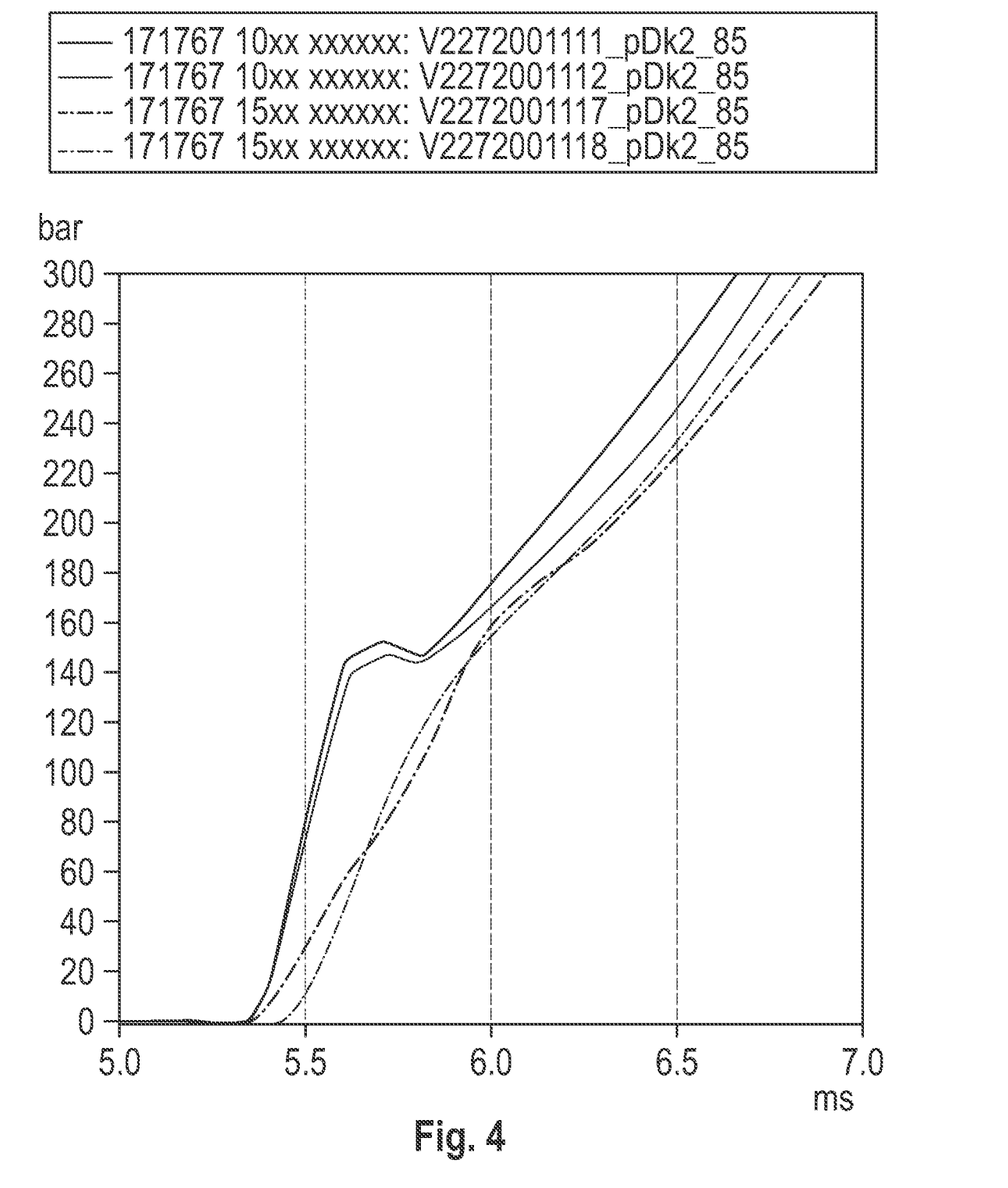
FIG. 4 shows a graph illustrating combustion chamber pressure curves of the gas generator according to the disclosure with different overall lengths of the sleeve.

FIG. 4 illustrates a graph showing combustion chamber pressure curves of the gas generator 100 according to the disclosure, wherein two differently long exemplary arrangement with respect to the sleeve 30 were used. Precisely, as is evident from the legend regarding FIG. 4, on the one hand a respective sleeve 30 having an axial overall length of 18 mm was used, and, on the other hand, a respective sleeve 30 having an axial overall length of 15 mm was used. The pressure curves show a time resolution for the first 7 milliseconds of the combustion chamber pressure curve as compared to FIG. 3, where a time resolution up to 20 milliseconds is represented.

From FIG. 4 it is clear that by the two continuous lines or curve displays which are to be associated with the tests with a sleeve 30 having the longer overall height, i.e., 18 millimeters, a substantially steeper and, thus, quicker rise of the combustion chamber pressure curve can be achieved. This may be extremely advantageous to applications in which a very rapid production of gas inside the combustion chamber is desired. For example, there are requirements or applications in which such a quick and steep onset of the combustion chamber pressure curve is of advantage and desired, such as for applications in which a cover of an airbag module is to be opened very quickly in order to subsequently fill a corresponding airbag more gently with gas from the gas generator.

Ultimately, with reference to FIGS. 3 and 4 and the above description, it is summed up that it has turned out unexpectedly that the disclosure allows, on the one hand, to advantageously reduce the maximum of a combustion chamber pressure in a combustion chamber of a gas generator and, on the other hand, to advantageously adjust or set the rise and, resp., the steepness of such combustion chamber pressure.

Referring to FIG. 5, an airbag module 250 comprising a gas generator 100 according to the disclosure, an airbag 300 inflatable by the gas generator 100 is shown.

The airbag module 250 is part of a vehicle safety system 200, for example for protecting a person such as a vehicle occupant or pedestrian. More specifically, the vehicle safety system 200 comprises a gas generator 100 according to the disclosure, an airbag 300 inflatable by the latter as part of the airbag module 250, and an electronic control unit 400 by which the gas generator 100 can be activated when a release situation is given.

The invention claimed is:

1. A gas generator for a vehicle safety system, comprising an ignition unit, a propellant which is configured in a combustion chamber in a form of a propellant bed extending along a longitudinal axis of the gas generator, wherein a sleeve having an axial opening protrudes into the propellant bed such that the sleeve surrounds the ignition unit at least partially and portions of the propellant are stored inside and outside the sleeve.

2. The gas generator according to claim 1,
wherein the sleeve surrounds the ignition unit at least partially at a radial distance and the ignition unit in the combustion chamber.

3. The gas generator according to claim 2, wherein no further propellant is stored next to the propellant and the ignition unit in the combustion chamber.

4. The gas generator according to claim 2, wherein the ignition unit protrudes at least partially into the propellant bed in such a way that a portion of the propellant is located between the ignition unit and the sleeve.

5. The gas generator according to claim 2, wherein the gas generator additionally has a second ignition unit associated with a combustion compartment separate from the combustion chamber, wherein the combustion compartment includes a propellant and/or a stored compressed gas and a diffuser is axially interposed between the ignition unit and the second ignition unit.

6. The gas generator according to claim 5, wherein by activating the ignition unit a moderate combustion of the propellant and/or a lower pressure level can be generated inside the combustion chamber, as compared to a gas generator which includes no sleeve as it is installed in the gas generator.

7. The gas generator according to claim 1,
wherein the ignition unit protrudes at least partially into the propellant bed in such a way that a portion of the propellant is located between the ignition unit and the sleeve.

8. A vehicle safety system to protect a vehicle occupant or pedestrian, comprising a gas generator, an airbag inflatable by the generator, as part of an airbag module, and an electronic control unit by which the gas generator can be activated when a trigger situation is given, wherein,
the gas generator is configured according to claim 1.

9. The gas generator according to claim 1, wherein no further propellant is stored next to the propellant and sleeve surrounds the ignition unit in the combustion chamber.

10. The gas generator according to claim 1, wherein
when the gas generator is not activated, the axial opening of the sleeve is unclosed and is surrounded substantially by the propellant only and/or the sleeve is stationarily secured to a housing of the gas generator or the ignition unit.

11. The gas generator according to claim 1, wherein
the combustion chamber extends in its axial longitudinal extension starting from the ignition unit along a housing of the gas generator to a volume compensation arrangement or a terminating housing part of the gas generator.

12. The gas generator according to claim 1, wherein
the sleeve extends relative to its longitudinal extension in a range from 20% to 80% of the longitudinal extension of the combustion chamber into the propellant bed.

13. The gas generator according to claim 1, wherein the sleeve has, relative to its longitudinal extension, 1.5 to 4 times a value of a longitudinal extension of the ignition unit and/or is designed as a hollow body open to both end faces.

14. The gas generator according to claim 1, wherein a housing to which the sleeve is secured is an outer housing of the gas generator, and/or the propellant is formed of single molded bodies.

15. The gas generator according to claim 1, wherein the gas generator additionally has a second ignition unit associated with a combustion compartment separate from the combustion chamber, wherein the combustion compartment includes a propellant and/or a stored compressed gas and a diffuser is axially interposed between the ignition unit and the second ignition unit.

16. The gas generator according to claim 1, wherein by activating the ignition unit, a moderate combustion of the propellant and/or a lower pressure level can be generated inside the combustion chamber, as compared to a gas generator, which includes no sleeve as the ignition unit is installed in the gas generator.

17. An airbag module comprising a gas generator, an airbag inflatable by a gas generator according to claim 1.

18. A method for operating a gas generator comprising the following steps of:
  a. providing a gas generator comprising an ignition unit, a propellant configured in a combustion chamber in a form of a propellant bed extending along a longitudinal axis of the gas generator, wherein a sleeve having an axial opening protrudes into the propellant bed such that it surrounds the ignition unit at least partially and portions of the propellant are stored inside and outside the sleeve;
  b. activating the ignition unit and igniting the portion of the propellant that is located inside the sleeve, wherein a part of the portion of the propellant is broken by a pressure surge of the ignition unit, thereby forming a larger combustion surface for more rapid combustion, then:
  c. igniting and burning the remaining propellant of the propellant bed at a combustion rate lower compared to step b.

* * * * *